(12) United States Patent
Makinen (10) Patent No.: US 6,826,443 B2
(45) Date of Patent: Nov. 30, 2004

(54) SYSTEMS AND METHODS FOR MANAGING INTERACTION WITH A PRESENTATION OF A TREE STRUCTURE IN A GRAPHICAL USER INTERFACE

(75) Inventor: Bruce A Makinen, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 321 days.

(21) Appl. No.: 09/997,858

(22) Filed: Nov. 29, 2001

(65) Prior Publication Data

US 2003/0098893 A1 May 29, 2003

(51) Int. Cl.[7] .............................................. G06F 19/00
(52) U.S. Cl. ........................ 700/121; 700/83; 345/853
(58) Field of Search .......................... 700/121, 83, 117; 345/853–854, 860, 808–809

(56) References Cited

U.S. PATENT DOCUMENTS

| | | | |
|---|---|---|---|
| 6,067,477 A | * | 5/2000 | Wewalaarachchi et al. ... 700/83 |
| 6,247,020 B1 | * | 6/2001 | Minard ..................... 707/104.1 |
| 6,552,721 B1 | * | 4/2003 | Ishikawa ..................... 345/418 |

* cited by examiner

Primary Examiner—Albert W. Paladini
Assistant Examiner—Zoila Cabrera (57) ABSTRACT

Systems and methods for managing interaction with a presentation of a tree structure in a graphical user interface are provided. Briefly described, one such method comprises the steps of: displaying a tree structure on a first portion of a graphical user interface; receiving a search request for an object in the tree structure having a predefined value via a second portion of the graphical user interface; displaying a search result in a third portion of the graphical user interface, the search result comprising one or more locations that satisfy the search request; and in response to selection of one of the locations, modifying the tree structure to display the selected location of the object having the predefined value.

23 Claims, 11 Drawing Sheets

SYSTEMS AND METHODS FOR MANAGING INTERACTION WITH A PRESENTATION OF A TREE STRUCTURE IN A GRAPHICAL USER INTERFACE

TECHNICAL FIELD

The present invention is generally related to the presentation of tree structures in a graphical user interface (GUI) and, more particularly, is related to systems and methods for managing interaction with a presentation of a tree structure in a GUI.

BACKGROUND OF THE INVENTION

Currently, a variety of systems and/or processes are used for inspecting manufacturing defects in printed circuit boards. Printed circuit boards typically include one or more electrical components (e.g., computer chips, capacitors, etc.) soldered to an integrated circuit (IC). For many years, the de facto process for production of printed circuit board assemblies included manual visual inspection (MVI) after soldering, followed by an electrical test, such as in-circuit testing (ICT), at the end of the assembly process to isolate any defects that occurred during manufacturing. Typically, a final functional test was run to verify that the printed circuit board operated properly before it was integrated into a final product.

As the need for more complex printed circuit boards having more components increased, automated inspection systems became popular. Such inspection systems typically comprise a printed circuit board modeling system, an imaging system, and a control system. Typically, the modeling system is used to generate a computer model of a printed circuit board that is to be mass-produced. The imaging system comprises hardware and/or software for capturing an image of the manufactured printed circuit board. Currently, image systems employ a variety of imaging techniques (e.g., x-ray, optical, ultrasonic, thermal image, etc.). The control system typically receives a file containing a computer model of the particular printed circuit board from the modeling system. Based on the computer model, the control system may generate an inspection program to be implemented by the imaging system. The inspection program may be used to image a manufactured printed circuit board, which is based on the computer model generated by the modeling system. After the imaging system generates the images of the manufactured printed circuit board, the images may be compared to the computer model to inspect for a variety of manufacturing defects (e.g., open solder joints, shorts, missing components, misaligned components, insufficient solder joints, excess solder joints, reversed capacitors, solder balls, solder voids, etc).

Control systems implemented in current PCB inspection systems typically employ a graphical user interface to assist in generating the inspection program for the imaging system and for interfacing with the PCB modeling system. The graphical user interface typically employs a display of a tree structure to aid in the inspection process. For example, the graphical user interface may include a display of the following hierarchical arrangement of objects: a root object corresponding to a family object that specifies a type of solder joint; one or more first-level objects corresponding to a package object that specifies a type of component in the printed circuit board; one or more second-level objects corresponding to an instance object that specifies a unique reference designator for a package; and one or more third-level objects corresponding to a pin object that specifies a unique pin number for a specific component. Such systems, however, are very problematic when a user desires to search for a particular object within the structure.

Thus, there is a need in the industry for improved systems and methods for managing interaction with a presentation of a tree structure in a graphical user interface.

SUMMARY OF THE INVENTION

The present invention provides systems and methods for managing interaction with a presentation of a tree structure in a graphical user interface.

The present invention may be viewed as a method for managing interaction with a presentation of a tree structure in a graphical user interface. Briefly described, one such method comprises the steps of: displaying a tree structure on a first portion of a graphical user interface; receiving a search request for an object in the tree structure having a predefined value via a second portion of the graphical user interface; displaying a search result in a third portion of the graphical user interface, the search result comprising one or more locations that satisfy the search request; and in response to selection of one of the locations, modifying the tree structure to display the selected location of the object having the predefined value.

The present invention may also be viewed as providing a system for managing interaction with a presentation of a tree structure in a graphical user interface. Briefly described, one such system comprises logic, a processing device configured to implement the logic, and a display device configured to support the graphical user interface. The logic is configured to: display a tree structure on a first portion of a graphical user interface; receive a search request for an object in the tree structure having a predefined value via a second portion of the graphical user interface; display a search result in a third portion of the graphical user interface, the search result comprising one or more locations that satisfy the search request; and modify, in response to selection of one of the locations, the tree structure to display the selected location of the object having the predefined value.

The present invention may also be viewed as providing a computer program embodied on a computer-readable medium for managing interaction with a presentation of a tree structure in a graphical user interface. Briefly, described one such computer program comprises logic configured to: display a tree structure on a first portion of a graphical user interface; receive a search request for an object in the tree structure having a predefined value via a second portion of the graphical user interface; display a search result in a third portion of the graphical user interface, the search result comprising one or more locations that satisfy the search request; and modify, in response to selection of one of the locations, the tree structure to display the selected location of the object having the predefined value.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
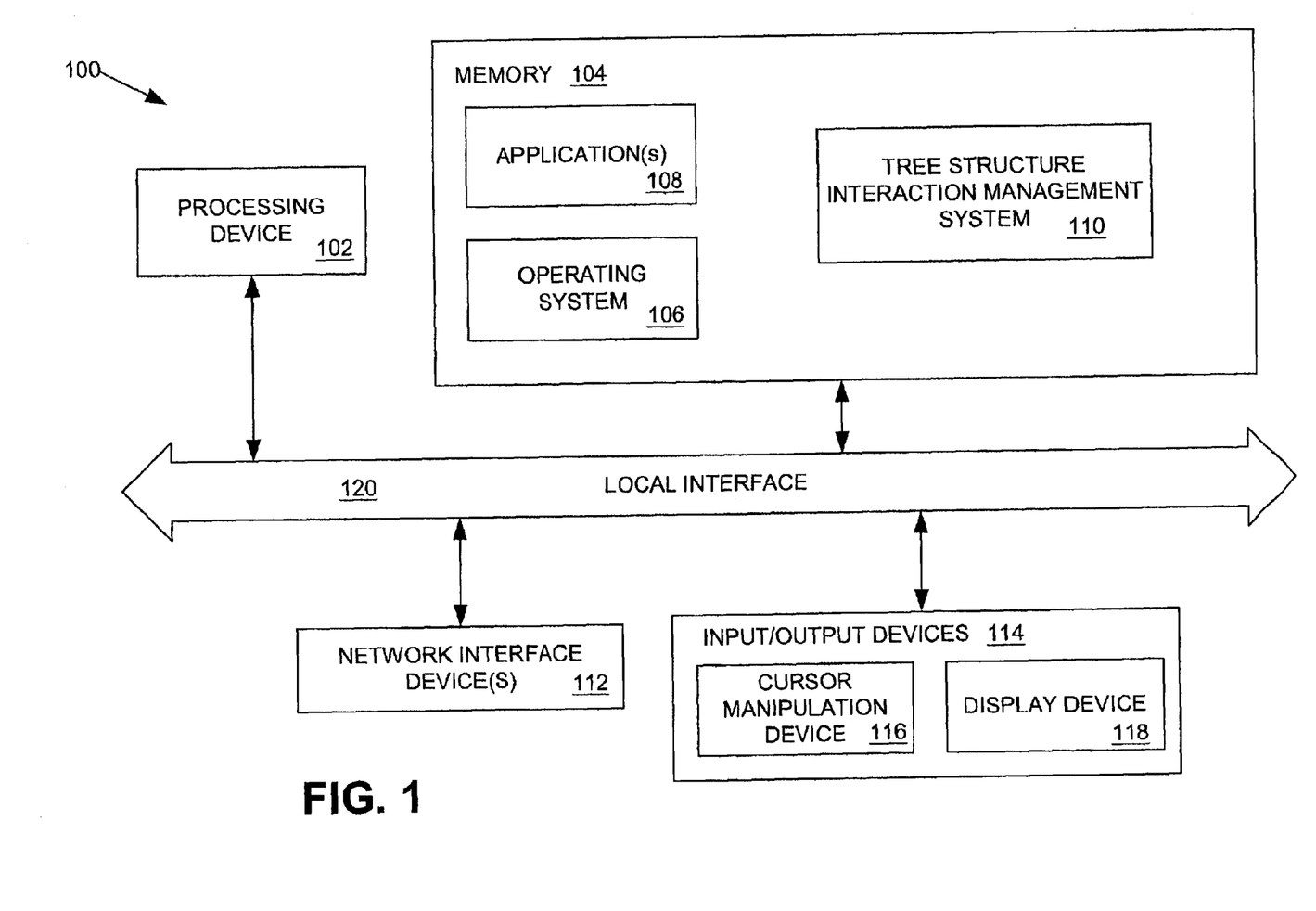
FIG. 1 is a block diagram of an embodiment of a system including an embodiment of a tree structure interaction management system of the present invention for managing interaction with a presentation of a tree structure in a graphical user interface.

FIG. 1 is a block diagram of a system 100 in which an embodiment of a tree structure interaction management system 110 of the present invention may be implemented. As described in more detail below, tree structure interaction management system 110 manages user interaction with a presentation of a tree structure in a graphical user interface (GUI). In general, tree structure interaction management system 110 enables a user to search a tree structure for the location of a particular object within the tree structure. Tree structure interaction management system 110 determines one or more locations within the tree structure where the specified object is located. Tree structure interaction management system 110 also enables the user to select one of the locations, in which case tree structure interaction management system 110 modifies the display of the tree structure to display the location of the specified object.

One of ordinary skill in the art will appreciate that tree structure interaction management system 110 may be configured for use with any type of tree structure. For example, the tree structure may be any hierarchical list of items, in which one or more parent items have one or more child items, or sub-items, associated with it. The tree structure may also include a root item above the parent items. For example, the tree structure may include a hierarchical arrangement of files, folders, and/or directories in a computer.

Figure 2:
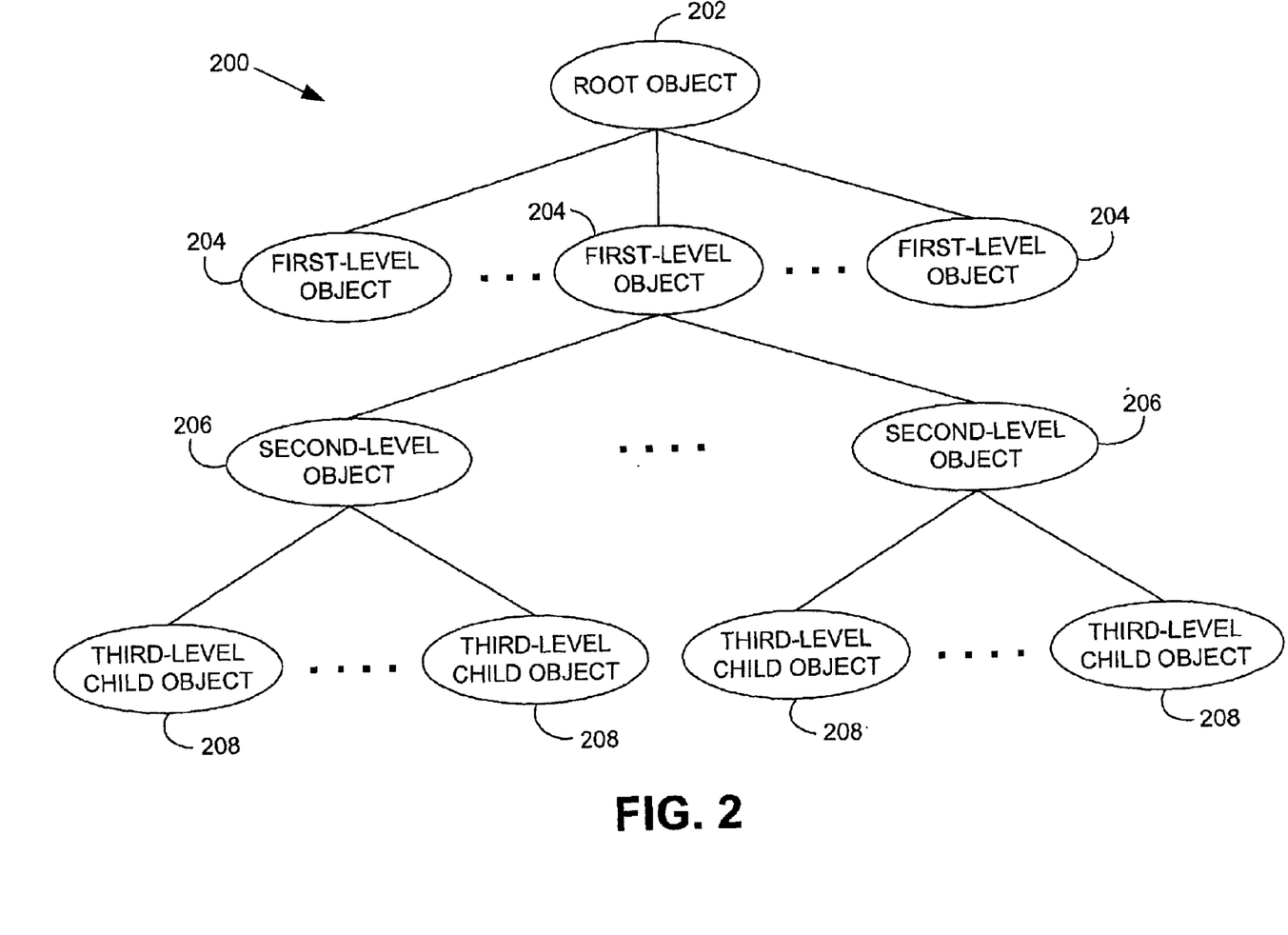
FIG. 2 is a data structure illustrating an embodiment of a tree structure capable of being implemented by the tree structure interaction management system of FIG. 1.

FIG. 2 is a data structure 200 illustrating an embodiment of a tree structure capable of being implemented by tree structure interaction management system 110. Data structure 200 comprises a root object 202, one or more first-level objects 204, one or more second-level objects 206, and one or more third-level objects 208. Each of the first-level objects 204 are logically linked to the root object 202. One or more of the first-level objects 204 may have one or more second-level objects 206 associated with it. Furthermore, one or more of the second-level objects 206 may 110 have one or more third-level objects 208 associated with it. Although the embodiment of FIG. 2, illustrates four levels of objects, it will be appreciated that the tree structure may comprise any number of levels of objects. In addition, the tree structure does not have to be symmetrical. For example, the tree structure may comprise a root object 202 and two first-level objects 204. One of the first-level objects 204 may be logically linked to one or more second-level objects 206, while the other first-level object 204 is not linked to a second-level object 204.

Tree structure interaction management system may be implemented in software, firmware, hardware, or a combination thereof. In the embodiment illustrated in FIG. 1, tree structure interaction management system 110 is implemented in software, as an executable program, which is executed by a processing device 102. Generally, in terms of hardware architecture, as shown in FIG. 1, system 100 comprises a processing device 102, memory 104, one or more network interface devices 112, and one or more input and/or output (I/O) devices 114 interconnected via a local interface 120. System 100 may further comprise additional components not illustrated in FIG. 1.

Referring again to FIG. 1, the various components of system 100 will be described. Local interface 120 may be, for example but not limited to, one or more buses or other wired or wireless connections. The local interface 120 may have additional elements, which are omitted for simplicity, such as controllers, buffers (caches), drivers, repeaters, and receivers, to enable communications. Furthermore, the local interface 120 may include address, control, and/or data connections to enable appropriate communications among the aforementioned components.

Processing device 102 is a hardware device for executing software, particularly that stored in memory 104. Processing device 102 may be any custom-made or commercially-available processor, a central processing unit (CPU), an auxiliary processor among several processors associated with system 100, a semiconductor based microprocessor (in the form of a microchip or chip set), a microprocessor, or generally any device for executing software instructions.

As illustrated in FIG. 1, memory 104 may comprise an operating system 106, one or more applications 108, and tree structure interaction management system 110. The architecture, operation, and/or functionality of tree structure interaction management system 110 will be described in detail below. Memory 104 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 104 may incorporate electronic, magnetic, optical, and/or other types of storage media. Furthermore, memory 104 may have a distributed architecture, in which various components are situated remote from one another, but can be accessed by processing device 102.

The software in memory 104 may include one or more separate programs, each of which comprises executable instructions for implementing logical functions. In the example of FIG. 1, the software in memory 104 includes tree structure interaction management system 110 according to the present invention. Memory 104 may further comprise a suitable operating system 106 that controls the execution of other computer programs, such as one or more applications 108 and tree structure interaction management system 110, and provides scheduling, input-output control, file and data management, memory management, and communication control and related services.

Tree structure interaction management system 110 may be a source program, executable program (object code), script, or any other entity comprising a set of instructions to be performed. When implemented as a source program, then the program needs to be translated via a compiler, assembler, interpreter, or the like, which may or may not be included within the memory 104, so as to operate properly in connection with operating system 106. Furthermore, tree structure interaction management system 110 may be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

Network interface device(s) 118 may be any device configured to facilitate communication between system 100 and a communication network, such as a public or private packet-switched or other data network including the Internet, a circuit switched network, such as the public switched telephone network, a wireless network, an optical network, or any other desired communications infrastructure.

Input/output devices 114 may comprise any device configured to communicate with local interface 120. One of ordinary skill in the art will appreciate that, depending on the configuration of system 100, input/output devices 120 may include any of the following, or other, devices: a keyboard, a mouse, display device, such a computer monitor, a serial port, a parallel port, a printer, speakers, a microphone, etc.

As illustrated in FIG. 1, system 100 may include a cursor manipulation device 116 and a display device 118. As described in detail below, tree structure interaction management system 110 may be configured to enable a user to interact with a tree structure in a graphical user interface via display device 118 and cursor manipulation device 116. Thus, one of ordinary skill in the art will appreciate that display device 118 may comprise any of the following (or other) types of devices configured to support the graphical user interface: a computer monitor, a liquid crystal display (LCD), a plasma-based display, an LED-based display, a touch-sensitive screen, such as those implemented in portable computing devices (e.g., a personal digital assistant (PDA)), and any other known or future display device, regardless of the underlying display technology. Furthermore, cursor manipulation device 116 may comprise any input device configured to cooperate with an application 108, operating system 106, and/or tree structure interaction management system 110 and manipulate a cursor displayed on the display device 118. For example, cursor manipulation device 116 may comprise a mouse, a trackball, a set of navigation keys (e.g., arrow keys), and a joystick stick, to name a few.

During operation of system 100, the processing device 102 is configured to execute logic stored within the memory 104, to communicate data to and from the memory 104, and to generally control operations of the system 100 pursuant to the software. Tree structure interaction management system 110 and operating system 106, in whole or in part, but typically the latter, are read by the processing device 102, perhaps buffered within the processing device 102, and then executed.

In embodiments where tree structure interaction management system 110 is implemented in software, as is shown in FIG. 1, tree structure interaction management system 110 may be stored on any computer-readable medium for use by or in connection with any computer related system or method. In the context of this document, a computer-readable medium may be an electronic, magnetic, optical, or other physical device or means that may contain or store a computer program for use by or in connection with a computer related system or method. Tree structure interaction management system 110 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In alternative embodiments where tree structure interaction management system 110 is implemented in hardware, tree structure interaction management system 110 may be implemented with any or a combination of the following, or other, technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
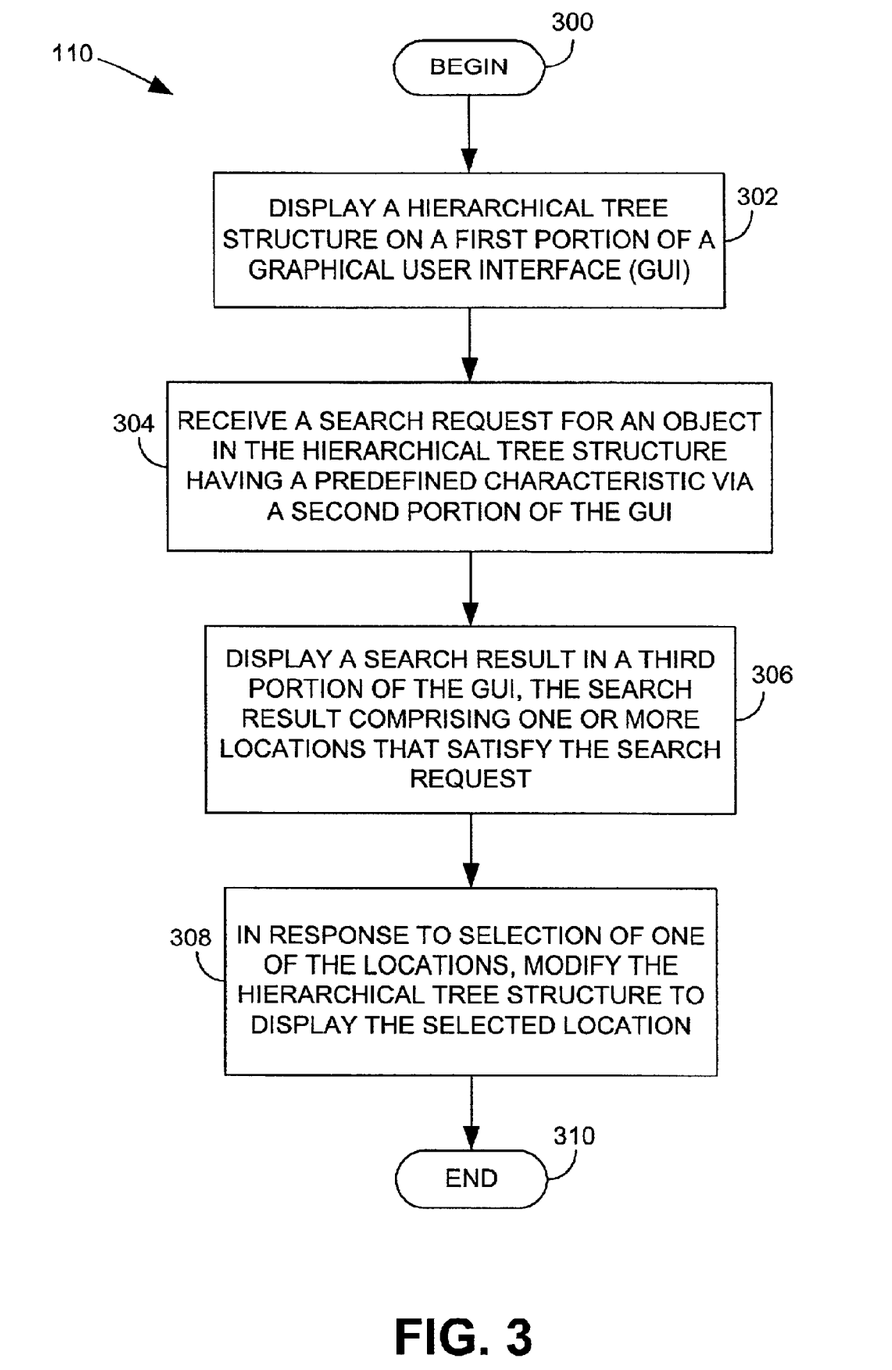
FIG. 3 is a flow chart illustrating the functionality, architecture, and/or operation of an embodiment of the tree structure interaction management system of FIG. 1.

As stated above, tree structure interaction management system 110 manages user interaction with a presentation of a tree structure in a graphical user interface (GUI). FIG. 3 is a flow chart illustrating the architecture, functionality, and/or operation of an embodiment of tree structure interaction management system 110. Tree structure interaction management system 110 begins at block 300. Tree structure interaction management system 110 may be initiated by a user via an I/O device 114. In certain embodiments, tree structure interaction management system 110 may be implemented as a function that may be called by operating system 106 and an application 108. For example, an application 108 configured to manage the files on a computing device, such as Windows Explorer, may call tree structure interaction management system 110 to display a hierarchical arrangement of the items and sub-items (e.g., files, directories, folders, etc.) located in memory. In this manner, the functionality of tree structure interaction management system 110 may be shared by various applications 108. In alternative embodiments, the functionality of tree structure interaction management system 110 may be seamlessly implemented within an application 108.

In further embodiments, tree structure interaction management system 110 may be implemented within operating system 106 as, for example, a dynamic-link library (DLL). For instance, a Windows-based operating system, may include a set of "common controls," which are a set of windows that are implemented by a common control library (e.g., a DLL). The common control is a child window that an application 108 uses in conjunction with another window to perform input/output tasks. The common controls may belong to a window class defined in the common control DLL. The window class and the corresponding window procedure define the properties, appearance, and behavior of the control.

Each type of common control may have a set of control styles that a software developer may use to vary the appearance and behavior of the control The common control library may also include a set of control styles that apply to two or more types of common controls. Because common controls are windows, an application 108 may manipulate them by using messages. In addition, the window class of each common control supports a set of control-specific messages that an application may use to manipulate the control. An application 108 may use any of the message sending or posting functions to pass messages to the control within operating system 106. Some common controls also have a set of macros that an application 106 may use instead of the sending or posting functions. The macros are typically easier to use than the functions.

As stated above, common controls are child windows, which may send notification messages to the parent window when events, such as input from the user, occur in the control. The application 108 may use these notification messages to determine what action the user wants it to take.

One type of common control implemented within such operating systems is a "tree-view control." One of ordinary skill in the art will appreciate that tree structure interaction management system 110 may be implemented within a tree-view control in operating system 106. Furthermore, tree structure interaction management system 110 may be implemented as a tree-view control within an application 108.

A tree-view control is a window that displays a hierarchical list of items, such as the headings in a document, the entries in an index, or the files and directories in memory. Each item consists of a label and an optional bitmapped image and virtual button. Each item can have a list of sub-items associated with it. A user may expand and collapse the associated list of sub-items by: (1) manipulating a cursor over the item or bitmapped image and double-clicking; and (2) manipulating the cursor over the virtual button and single-clicking.

Applications 108 may create an application-specific tree-view control by initiating a particular window class associated with the operating system. The class is registered when the common control DLL is loaded. To ensure that the appropriate DLL is loaded, application 108 may include a function call in the application. After creating a tree-view control, an application may add, remove, arrange, or otherwise manipulate items by sending messages to the control. Each message has one or more corresponding macros that may be used instead of sending the message explicitly.

Tree-view styles may be used to control the appearance of the tree-view control. For instance, the application 108 may set the initial styles when the tree-view control is created. The application 108 may retrieve and/or change the styles after creating the tree-view control by using predefined function calls recognized by the operating system 106. One predefined style function call may be used to enhance the graphic representation of the hierarchy of a tree-view control by drawing lines that link child items to their parent item. As mentioned above, another function call may expand and/or collapse a parent item's list of child items by double-clicking the parent item. Yet another function call may be used to add the virtual button to the left side of each parent item. The user may click the virtual button once instead of double-clicking the parent item to expand and collapse the child. Yet another function call may be used to enable the user to edit the text labels of the tree-view items.

Any item in a tree-view control can have a list of sub-items, or child items, associated with it. An item that has one or more child items is called a parent item. A child item is displayed below its parent item and is indented to indicate that it is subordinate to the parent. An item that has no parent appears at the top of the hierarchy and is called a root item.

At any given time, the state of a parent item's list of child items may be either expanded or collapsed. When the state is expanded, the child items are displayed below the parent item. When it is collapsed, the child items are not displayed. The list automatically toggles between the expanded and collapsed states when the user double-clicks the parent item or, where applicable, the user clicks the button associated with the parent item. An application 108 may expand or collapse the child items by using a predefined message.

A tree-view control sends the parent window a predefined notification message when a parent item's list of child items is about to be expanded or collapsed.

The notification gives the application 108 the opportunity to prevent the change or to set any attributes of the parent item that depend on the state of the list of child items. After changing the state of the list, the tree-view control may send the parent window another predefined notification message. When a list of child items is expanded, it may be indented relative to the parent item. Additional information related to Windows-based tree-view controls may be found on the Microsoft Developer Network (MSDN) web site at http://msdn.microsoft.com/library/, the content of which is hereby incorporated by reference in its entirety.

Regardless of the manner in which it is initiated, at block 302, tree structure interaction management system 110 displays a hierarchical tree structure on a first portion of a graphical user interface. Tree structure interaction management system 110 may be configured to display the tree structure as described above. At block 304, tree structure interaction management system 110 receives a search request for a particular object in the hierarchical tree structure having a predefined characteristic. The search request is received via a second portion of the graphical user interface. For example, a user may request the location of a particular object in the tree structure by name via a text box located in the second portion of the graphical user interface.

After the search request is received, at block 306, tree structure interaction management system 110 displays a search result in a third portion of the graphical user interface. Depending on the particular search request and the contents of the tree structure, the search result may comprise one or more locations that satisfy the search request. For example, consider the situation where the search request contains the name of a particular object and the tree structure contains multiple objects that match the requested name. In this case, tree structure interaction management system 110 may display the location of each of the objects that match the search request.

At block 308, tree structure interaction management system 110 may respond to the selections by a user of one of the locations in the search result by modifying the hierarchical tree structure to display the selected location. For example, where the tree structure is configured as an expandable structure as described above, tree structure interaction management system 110 may expand the tree structure to display the location of the selected object. Tree structure interaction management system 110 terminates at block 310.

Figure 4:
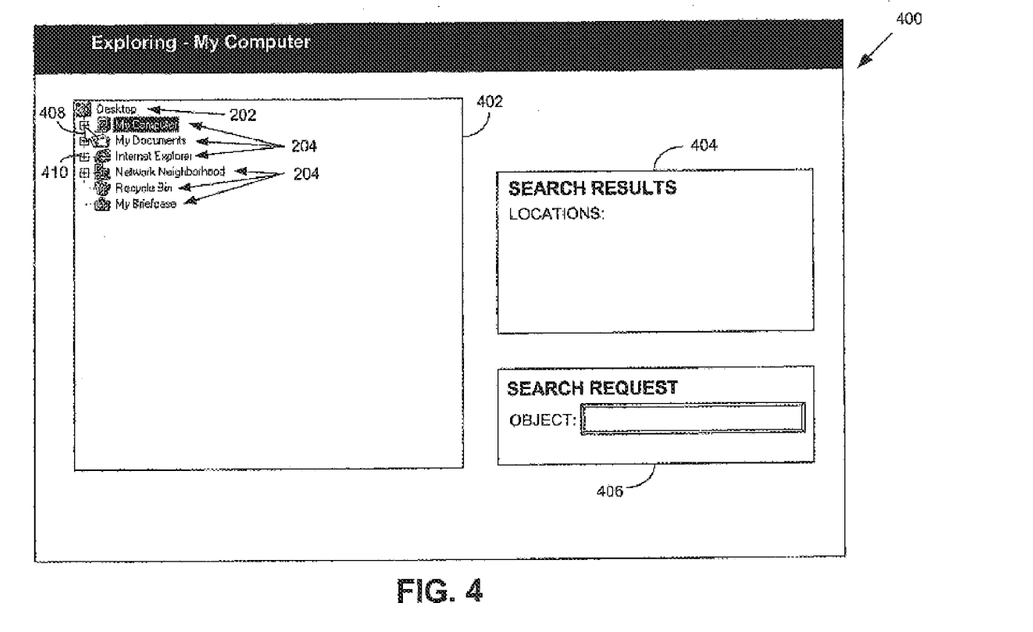
FIG. 4 is a screen shot of an embodiment of a graphical user interface generated by the tree structure interaction management system of FIGS. 1 and 3.

With reference to the screen shots of FIGS. 4–8 of a representative graphical user interface, a particular embodiment of tree structure interaction management system 110 will be described. FIG. 4 is a screen shot 400 of an embodiment of a graphical user interface generated by tree structure interaction management system 110. The graphical user interface may comprise a first portion 402 for displaying the tree structure, a second portion 406 for receiving a search request for a particular object in the tree structure, and a third portion 404 for displaying search results corresponding to the search request.

Figure 5:
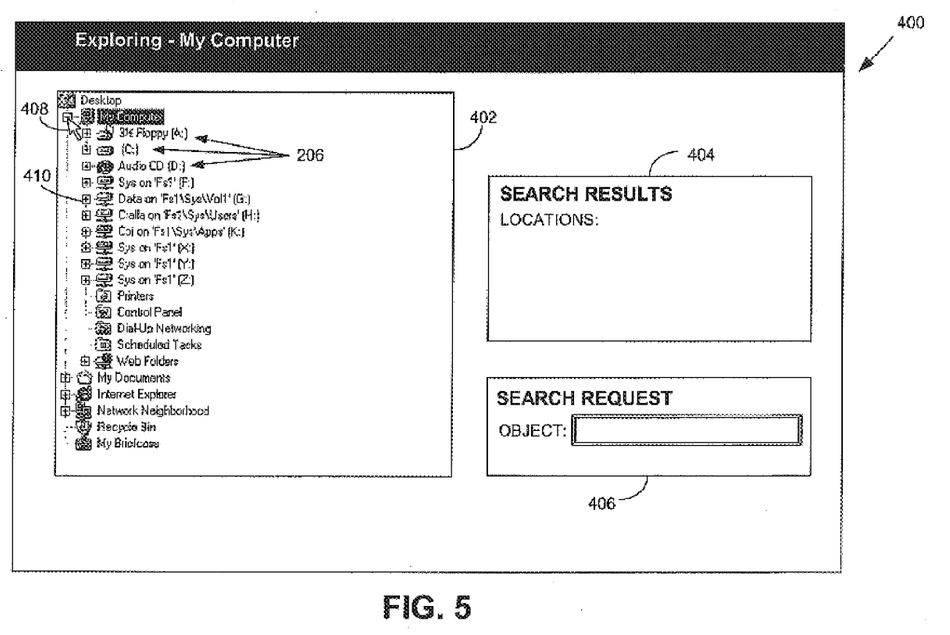
FIG. 5 illustrates the screen shot of FIG. 4 in which the tree structure has been expanded to display second-level objects.

As illustrated in FIG. 4, the tree structure may comprise a hierarchical list of folders, files, and/or devices associated with a computer (e.g., a tree structure displayed by an application such as Windows Explorer). Thus, the tree structure may comprise a root object 202 entitled "Desktop" and first-level objects 204 entitled "My Computer," "My Documents," "Internet Explorer," "Network Neighborhood," "Recycle Bin," and "My Briefcase." As illustrated in FIG. 4, one or more of the first-level objects 204 may be logically linked to one or more second-level objects 206. In FIG. 4, first-level objects 204 with second-level objects 206 have a virtual button 410, which may be engaged by a cursor 408 as described above, thereby expanding and/or collapsing the tree structure to display the second-level objects 206. FIG. 5 illustrates the screen shot of FIG. 4 in which the virtual button 410 associated with the first-level object 204 entitled "My Computer" has been engaged by a user to expand the tree structure and display second-level objects 206 logically linked to the object 204. As illustrated in FIG. 5, the second-level objects 206 may also be linked to one or more lower level objects, which may be displayed by expanding the corresponding virtual button 410.

Portion 406 of the graphical user interface may be configured to enable a user to specify a search request. In the embodiment illustrated in FIG. 4, portion 406 comprises a text box in which a user may specify the search request. One of ordinary skill in the art will appreciate that tree structure interaction management system 110 may be configured in a variety of alternative ways.

As stated above, the search results for the search request specified in portion 406 may be displayed in portion 404 of the graphical user interface. Portion 404 may specify the locations of the objects within the tree structure that satisfy the search request. Tree structure interaction management system 110 may be configured to display the search results in a variety of ways. For example, the search results may be displayed as a simple text list. The search results may also be displayed in a dialogue box or a pop-up window.

Figure 6:
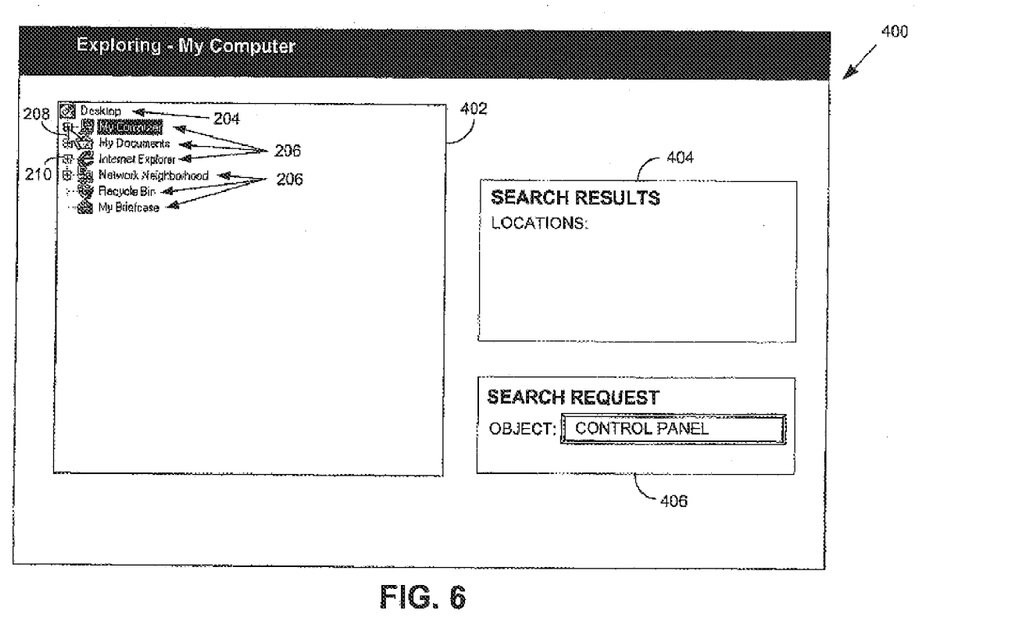
FIG. 6 illustrates the screen shot of FIG. 4 in which a user is searching for the location of the object "control panel" in the tree structure.
Figure 7:
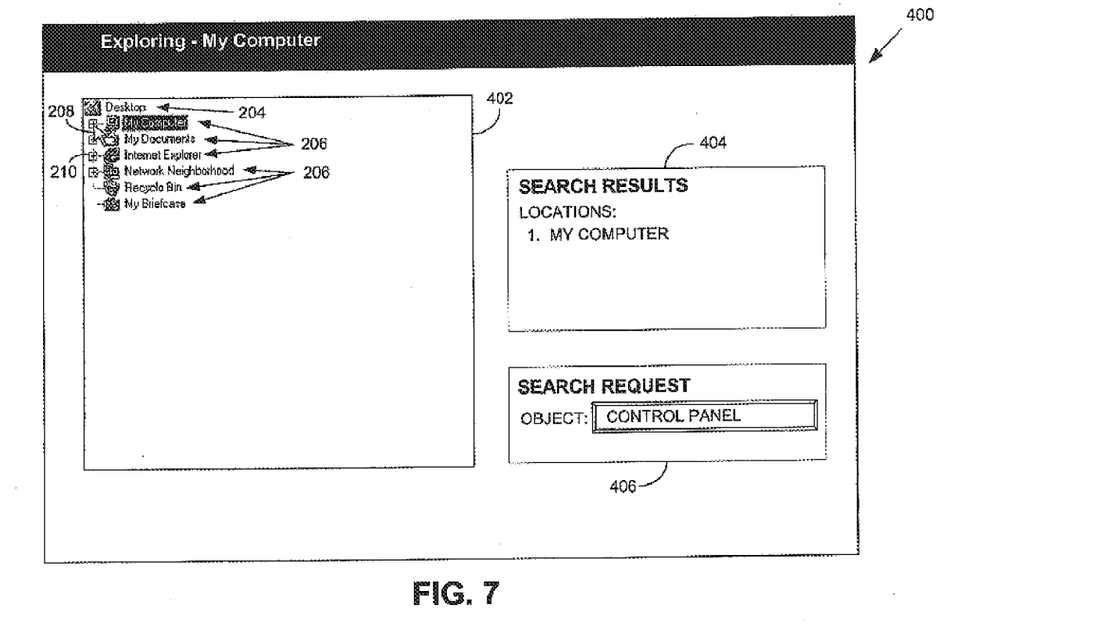
FIG. 7 illustrates the screen shot of FIG. 6 in which the search results for the object "control panel" are displayed.

As illustrated in FIG. 6, tree structure interaction management system 110 enables a user to specify a search request in portion 406. For example, the user may desire to ascertain the location of an object entitled "Control Panel." The user may type in the name of this object, in which case tree structure interaction management system 110 may determine the locations within the tree structure where this object may be found. As illustrated in FIG. 7, tree structure interaction management system 110 may display the search results in portion 404. In the current example, tree structure interaction management system 110 may determine that the object "Control Panel" (a second-level object 206) is located under the first-level object 204 entitled "My Computer" and display this information in the portion 404. Tree structure interaction management system 110 may display the name of the corresponding parent object, as in this case, or may display alternative information identifying any of the objects that are logically linked to the requested object. Furthermore, tree structure interaction management system 110 may be configured to automatically modify the tree structure to display the location of the object identified in the search request, which may be beneficial in circumstances where only one location satisfies the search request.

Figure 8:
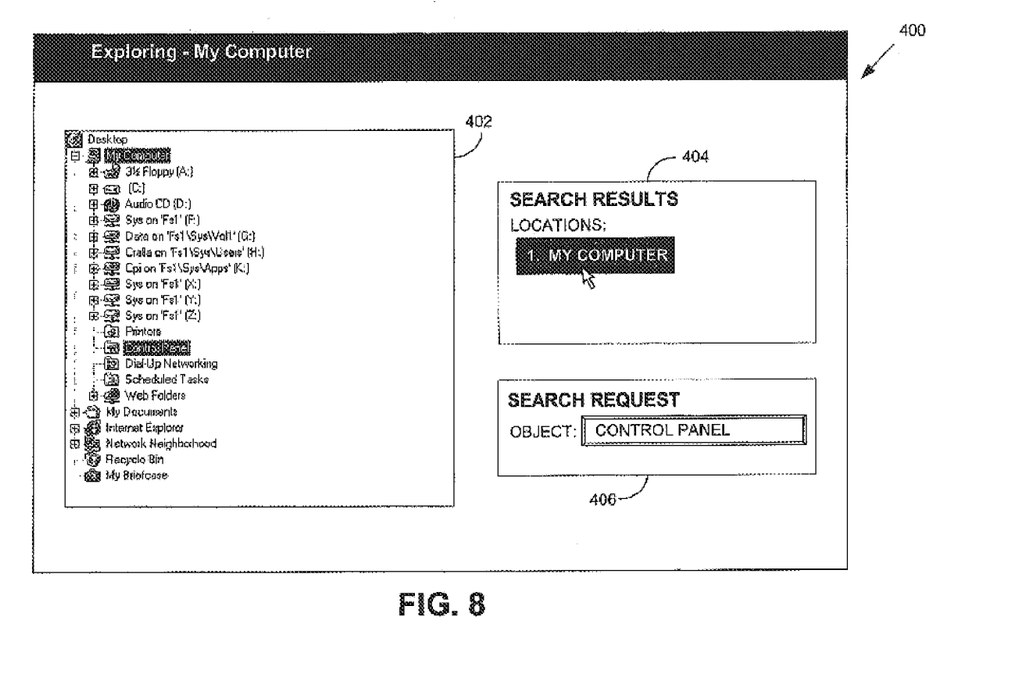
FIG. 8 illustrates the screen shot of FIG. 7 in which a user has selected the location "My Computer" and the tree structure has been expanded to display the location of "My Computer."

After the search results are displayed in portion 404, the user may select one of the locations as illustrated in FIG. 8. In response to the user selection, tree structure interaction management system 110 may modify the tree structure to display the selected location of the object in the search request. For example, tree structure interaction management system 110 may modify the tree structure by expanding the tree structure to display the desired object. Tree structure interaction management system 110 may also highlight the desired object and/or one of the other objects logically linked to the desired object. In the embodiment illustrated in FIG. 8, the tree structure in portion 402 has been expanded to display the second-level objects 206 (including the desired object "Control Panel") logically linked to the corresponding first-level object 204 ("My Computer"). One of ordinary skill in the art will appreciate that tree structure interaction management system 110 may be configured to modify the tree structure (in response to selection of one of the locations or automatically as described above) in a variety of ways depending on the manner in which the tree structure is displayed.

Figure 9:
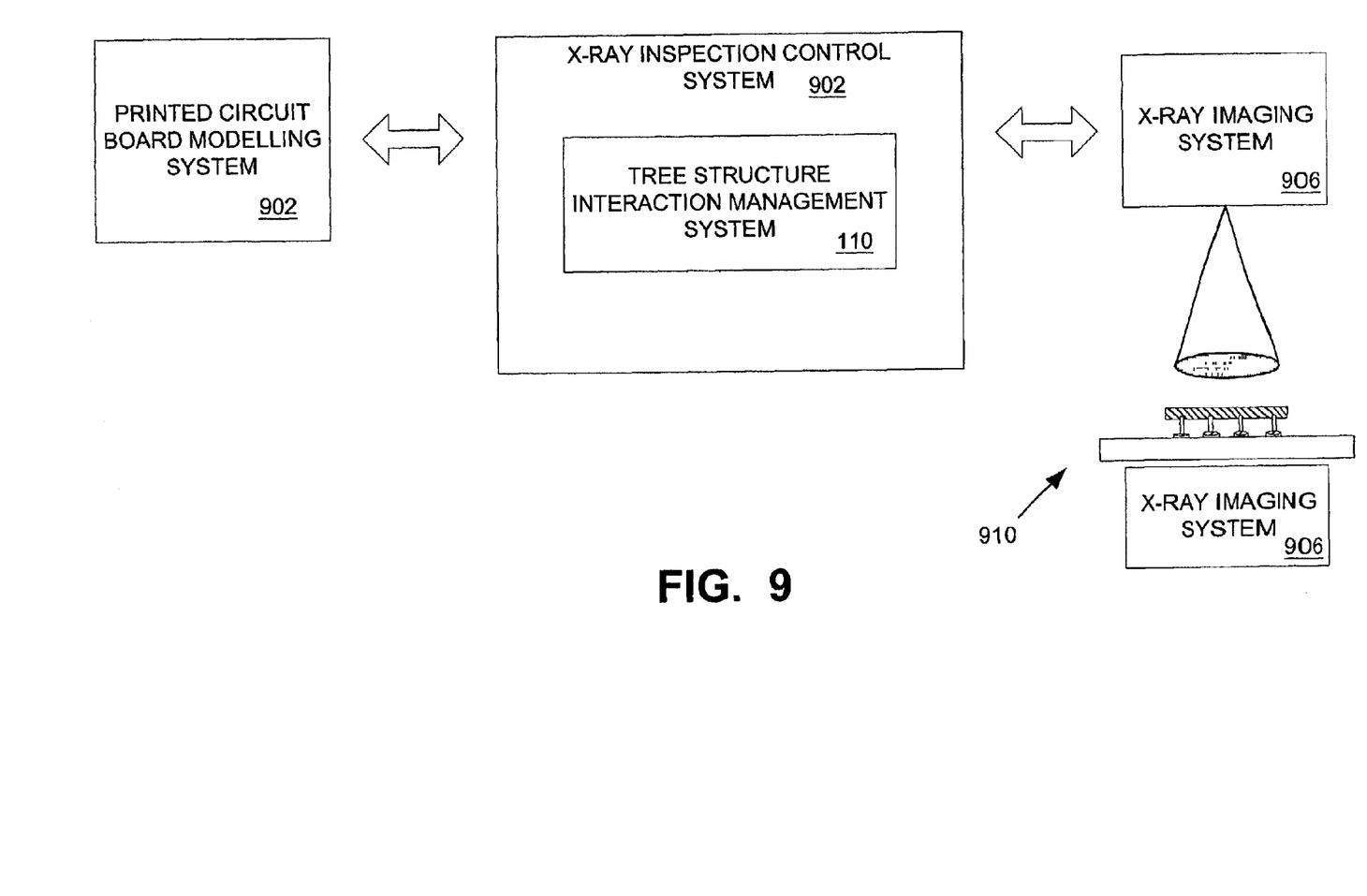
FIG. 9 is a block diagram of another embodiment of a system in which the tree structure interaction management system of the present invention may be implemented.

Tree structure interaction management system 110 may be implemented in a variety of other systems and/or a variety of computer applications. FIG. 9 is a block diagram of a system 900 for inspecting manufacturing defects in printed circuit boards, in which tree structure interaction management system 110 may be implemented. System 900 comprises a printed circuit board modeling system 902, an x-ray inspection control system 904, an x-ray imaging system 906, and a printed circuit board 910. In general, PCB modeling system 902 is a system for generating a computer model of a printed circuit board. PCB modeling system 902 may be any known or later developed computer-aided design (CAD) system capable of modeling any type of printed circuit board.

Figure 10:
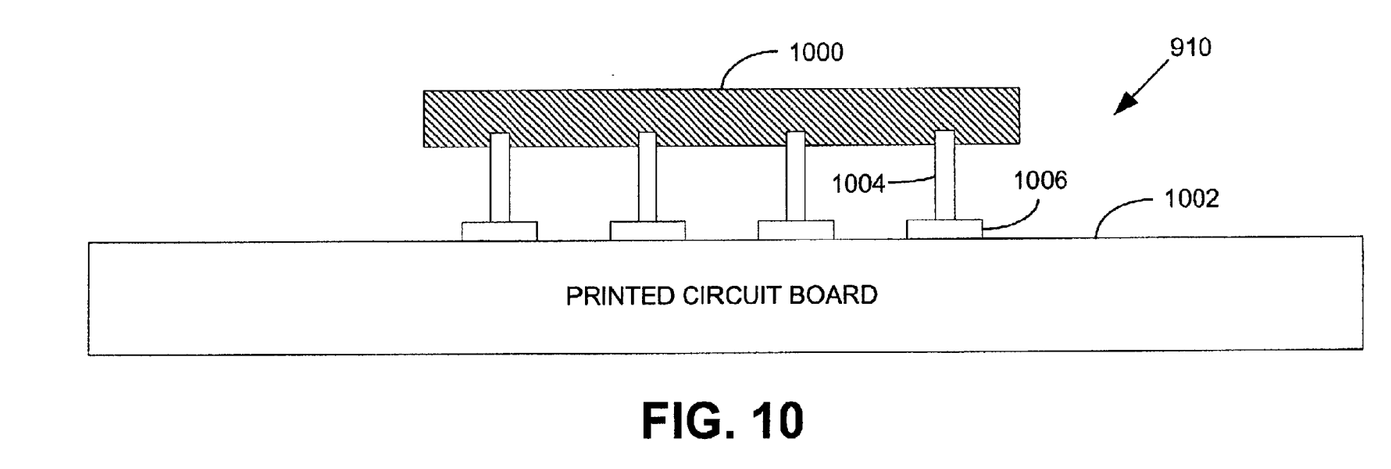
FIG. 10 is a block diagram illustrating a printed circuit board that may be inspected by the system of FIG. 9.
Figure 11:
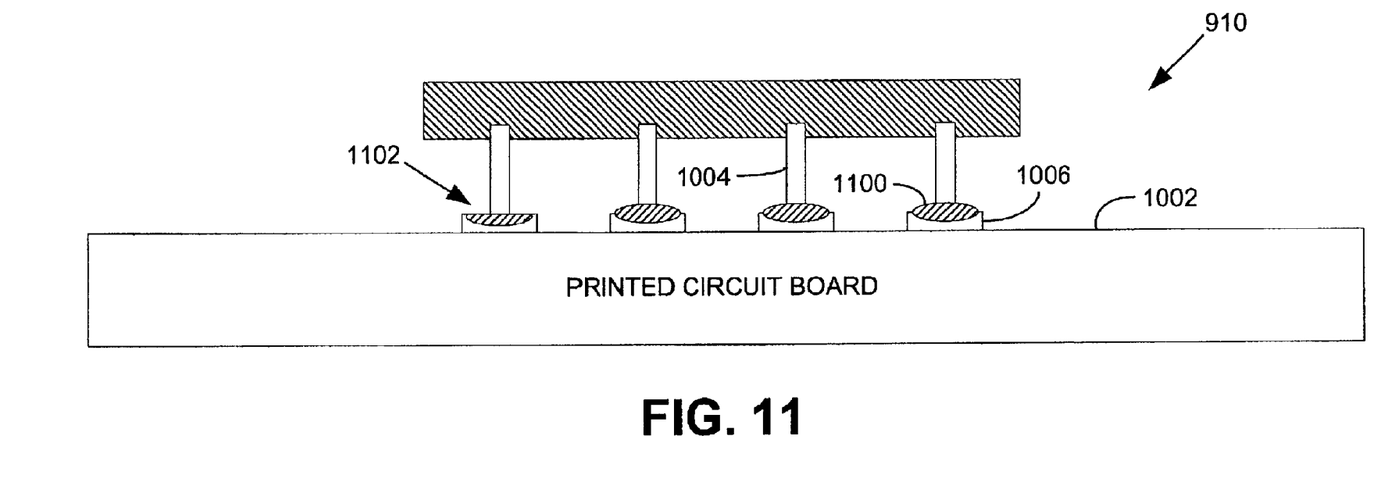
FIG. 11 is a block diagram illustrating a printed circuit board that may be inspected by the system of FIG. 9, which has a manufacturing defect.

FIGS. 10 and 11 illustrate cross-sectional diagrams of a printed circuit board 910 that may be modeled using PCB modeling system 902 and inspected using system 900. As illustrated in FIG. 10, printed circuit board 910 may comprise a component 1000 having one or more pins 1004. Component 1000 may comprise any type of electrical component for which it is desirable to solder to a PCB substrate 1002. PCB substrate 1002 includes an underlying integrated circuit (IC) that comprises a plurality of termination points 1006, which may be soldered to the pins 1004 during the manufacturing process.

As illustrated in FIG. 11, during the manufacturing process, component 1000 may be electrically connected to the termination points 1006 on the PCB substrate 1002 via a soldering material 1100. FIG. 1 illustrates printed circuit board 910 after the soldering process. By way of example, during the manufacturing process a variety of defects may result. For instance, in FIG. 11, the left-most pin 1004 may have a soldering defect (represented by reference numeral 1102). One of ordinary skill in the art will appreciate that any of the following, or other, defects may occur during the manufacturing process: open solder joints, shorts, missing components, misaligned components, insufficient solder joints, excess solder joints, reversed capacitors, solder balls, solder voids, etc.

X-ray imaging system 906 comprises imaging hardware and/or software for capturing an x-ray image of a manufactured printed circuit board. One of ordinary skill in the art will appreciate that system 900 may employ any of a variety of other types of imaging techniques (e.g., optical, ultrasonic, thermal image, etc.). X-ray inspection control system 904 interfaces with PCB modeling system 902 and x-ray imaging system 906. For instance, x-ray inspection control system 904 may receive a file containing a computer model of a particular printed circuit board from PCB modeling system 902. Based on the computer model, x-ray inspection control system 904 may generate an inspection program to be implemented by x-ray imaging system 906. The inspection program may be used to image a manufactured printed circuit board, which is based on the computer model generated by PCB modeling system 902. After generating images of the manufactured printed circuit board, the images may be compared to the computer model to inspect for a variety of manufacturing defects (e.g., open solder joints, shorts, missing components, misaligned components, insufficient solder joints, excess solder joints, reversed capacitors, solder balls, solder voids, etc).

As illustrated in FIG. 9, x-ray inspection control system 904 may implement tree structure interaction management system 110 in order to improve the inspection process and facilitate generation of the inspection program provided to x-ray imaging system 906. As described above in general, tree structure interaction management system 110 manages user interaction with a presentation of a tree structure in a graphical user interface (GUI). In general, tree structure interaction management system 110 enables a user to search a tree structure for the location of a particular object within the tree structure. Tree structure interaction management system 110 determines one or more locations within the tree structure where the specified object is located. Tree structure interaction management system 110 also enables the user to select one of the locations, in which case tree structure interaction management system 110 modifies the display of the tree structure to display the location of the specified object.

Accordingly, in order to generate the inspection program, x-ray inspection control system 904 may employ a tree structure corresponding to the computer model of the printed circuit board. For example, x-ray inspection control system 904 may include the following hierarchical arrangement of objects: a root object 202 corresponding to a family object that specifies a type of solder joint; one or more first-level objects 204 corresponding to a package object that specifies a type of component in the printed circuit board; one or more second-level objects 206 corresponding to an instance object that specifies a unique reference designator for a package; one or more third-level objects 208 corresponding to a pin object that specifies a unique pin number for a specific component. Thus, x-ray inspection control system 904 may be able to identify each pin on a component using this data structure.

Figure 12:
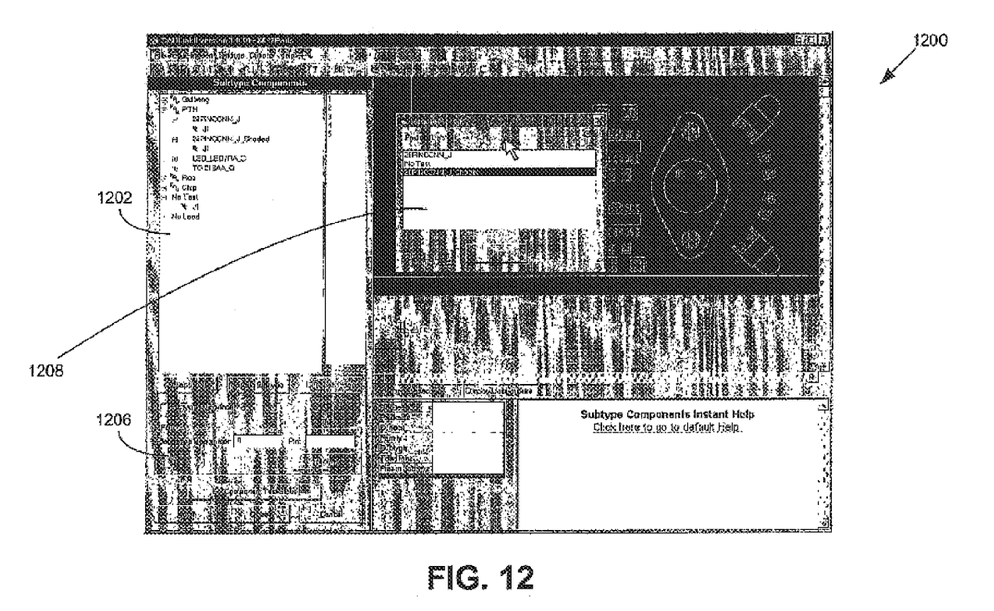
FIG. 12 is a screen shot of another embodiment of a graphical user interface generated by the tree structure interaction management system of FIGS. 1 and 3, which may be implemented in the x-ray inspection control system of FIG. 9

FIG. 12 is a screen shot 1200 of another embodiment of a graphical user interface generated by tree structure interaction management system 110 and which may be implemented in x-ray inspection control system 904. The graphical user interface may comprise a portion for displaying the tree structure described above, a portion 1206 for receiving a search request for a particular object in the tree structure, and a portion 1208 for displaying search results corresponding to the search request. As illustrated in FIG. 12, portion 1206 may be configured to enable a user to search based on a particular instance (unique reference designator) object, pin object, etc. Furthermore, portions 1206, 1202, and 1208 may be configured in any of the ways described above.

It should be emphasized that the above-described embodiments of tree structure interaction management system 110, particularly, any "described" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

What is claimed is:

1. A method for managing interaction with a presentation of a tree structure in a graphical user interface, the method comprising the steps of:

displaying a tree structure on a first portion of a graphical user interface, the tree structure comprising a root object, one or more first-level objects, one or more second-level objects, and one or more third-level objects, wherein:

the tree structure correlates to a model of a printed circuit board used in an x-ray inspection control system, the printed circuit board having one or more components having one or more pins soldered to the printed circuit board;

the root object corresponds to a family object that specifies a type of solder joint;

the one or more first-level objects correspond to a package object that specifies a type of component;

the one or more second-level objects correspond to an instance that specifies a unique designator for a package; and the one or more third-level objects correspond to a pin object that specifies a unique pin number for a specific component; and receiving a search request for an object in the tree structure having a predefined value via a second portion of the graphical user interface;

displaying a search result in a third portion of the graphical user interface, the search result comprising one or more locations that satisfy the search request; and in response to selection of one of the locations, modifying the tree structure to display the selected location of the object having the predefined value.

2. The method of claim 1, wherein the step of modifying the tree structure to display the selected location comprises expanding the tree structure.

3. The method of claim 1, wherein the step of modifying the tree structure to display the selected location comprises highlighting the object having the predefined value.

4. The method of claim 1, wherein the step of receiving a search request for an object comprises the step of receiving text via a text box displayed in the second portion of the graphical user interface.

5. The method of claim 1, wherein the third portion of the graphical user interface comprises a pop-up window.

6. The method of claim 1, wherein the tree structure comprises one or more parent objects, at least one of the parent objects having one or more child objects.

7. The method of claim 6, wherein the tree structure represents the contents of a computer.

8. A system for managing interaction with a presentation of a tree structure in a graphical user interface, the system comprising:
logic configured to:
display a tree structure on a first portion of a graphical user interface, the tree structure comprising a root object, one or more first-level objects, one or more second-level objects, and one or more third-level objects, and wherein:
the tree structure correlates to a model of a printed circuit board used in an x-ray inspection control system, the printed circuit board having one or more components having one or more pins soldered to the printed circuit board;
the root object corresponds to a family object that specifies a type of solder joint;
the one or more first-level objects correspond to a package object that specifies a type of component;
the one or more second-level objects correspond to an instance that specifies a unique designator for a package; and
the one or more third-level objects correspond to a pin object that specifies a unique pin number for a specific component; and
receive a search request for an object in the tree structure having a predefined value via a second portion of the graphical user interface;
display a search result in a third portion of the graphical user interface, the search result comprising one or more locations that satisfy the search request; and
modify, in response to selection of one of the locations, the tree structure to display the selected location of the object having the predefined value;
a processing device configured to implement the logic; and
a display device configured to support the graphical user interface.

9. The system of claim 8, wherein the logic is further configured to modify the tree structure to display the selected location by expanding the tree structure.

10. The system of claim 8, wherein the logic is further configured to modify the tree structure to display the selected location by highlighting the object having the predefined value.

11. The system of claim 8, wherein the logic is further configured to receive the search request for an object via a text box displayed in the second portion of the graphical user interface.

12. The system of claim 8, wherein the third portion of the graphical user interface comprises a pop-up window.

13. The system of claim 8, wherein the tree structure comprises one or more parent objects, at least one of the parent objects having one or more child objects.

14. The system of claim 13, wherein the tree structure represents the contents of a computer.

15. A computer program embodied on a computer-readable medium for managing interaction with a presentation of a tree structure in a graphical user interface, the computer program comprising logic configured to:
display a tree structure on a first portion of a graphical user interface, the tree structure comprising a root object, one or more first-level objects, one or more second-level objects, and one or more third-level objects, and wherein:
the tree structure correlates to a model of a printed circuit board used in an x-ray inspection control system, the printed circuit board having one or more components having one or more pins soldered to the printed circuit board;
the root object corresponds to a family object that specifies a type of solder joint;
the one or more first-level objects correspond to a package object that specifies a type of component;
the one or more second-level objects correspond to an instance that specifies a unique designator for a package; and
the one or more third-level objects correspond to a pin object that specifies a unique pin number for a specific component; and
receive a search request for an object in the tree structure having a predefined value via a second portion of the graphical user interface;
display a search result in a third portion of the graphical user interface, the search result comprising one or more locations that satisfy the search request; and
modify, in response to selection of one of the locations, the tree structure to display the selected location of the object having the predefined value.

16. The computer program of claim 15, wherein the logic is further configured to modify the tree structure to display the selected location by expanding the tree structure.

17. The computer program of claim 15, wherein the logic is further configured to modify the tree structure to display the selected location by highlighting the object having the predefined value.

18. The computer program of claim 15, wherein the logic is further configured to receive the search request for an object via a text box displayed in the second portion of the graphical user interface.

19. The computer program of claim 15, wherein the third portion of the graphical user interface comprises a pop-up window.

20. The computer program of claim 15, wherein the tree structure comprises one or more parent objects, at least one of the parent objects having one or more child objects.

21. The computer program of claim 20, wherein the tree structure represents the contents of a computer.

22. A system for managing interaction with a presentation of a tree structure in a graphical user interface, the system comprising:
means for displaying a tree structure on a first portion of a graphical user interface, the tree structure comprising a root object, one or more first-level objects, one or more second-level objects, and one or more third-level objects, and wherein;

the tree structure correlates to a model of a printed circuit board used in an x-ray inspection control system, the printed circuit board having one or more components having one or more pins soldered to the printed circuit board;

the root object corresponds to a family object that specifies a type of solder joint;

the one or more first-level objects correspond to a package object that specifies a type of component;

the one or more second-level objects correspond to an instance that specifies a unique designator for a package; and the one or more third-level objects correspond to a pin object that specifies a unique pin number for a specific component; and means for receiving a search request for an object in the tree structure having a predefined value via a second portion of the graphical user interface;

means for displaying a search result in a third portion of the graphical user interface, the search result comprising one or more locations that satisfy the search request; and means for modifying the tree structure to display the selected location of the object having the predefined value in response to selection of one of the locations.

23. The system of claim 22, wherein the means for modifying the tree structure logic expands the tree structure.

* * * * *